US012803974B2

(12) United States Patent
Bouchuiguir et al.

(10) Patent No.: US 12,803,974 B2
(45) Date of Patent: Nov. 17, 2026

(54) AEROSOL GENERATING DEVICE, ELECTRONIC COMMUNICATION DEVICE AND METHOD

(71) Applicant: JT International SA, Geneva (CH)

(72) Inventors: Layth Sliman Bouchuiguir, Bellevue (CH); Pier Paolo Monticone, Le Grand-Saconnex (CH)

(73) Assignee: JT International SA, Geneva (CH)

( * ) Notice: Subject to any disclaimer, the term of this patent is extended or adjusted under 35 U.S.C. 154(b) by 0 days.

(21) Appl. No.: 18/854,666

(22) PCT Filed: Apr. 8, 2022

(86) PCT No.: PCT/EP2022/059479
§ 371 (c)(1),
(2) Date: Oct. 7, 2024

(87) PCT Pub. No.: WO2023/193930
PCT Pub. Date: Oct. 12, 2023

(65) Prior Publication Data

US 2026/0019415 A1 Jan. 15, 2026

(51) Int. Cl.

| | |
|---|---|
| ***H04L 9/40*** | (2022.01) |
| ***A24F 40/53*** | (2020.01) |
| ***A24F 40/65*** | (2020.01) |
| ***H04L 67/141*** | (2022.01) |

(52) U.S. Cl.
CPC ............ *H04L 63/083* (2013.01); *A24F 40/53* (2020.01); *A24F 40/65* (2020.01); *H04L 67/141* (2013.01)

(58) Field of Classification Search
CPC ...... H04L 63/083; H04L 67/141; A24F 40/53; A24F 40/65
USPC .......................................................... 709/227
See application file for complete search history.

(56) References Cited

U.S. PATENT DOCUMENTS

| | | | | |
|---|---|---|---|---|
| 11,517,042 | B2 * | 12/2022 | Gorelick | A24F 13/02 |
| 2013/0340775 | A1 * | 12/2013 | Juster | H04L 12/1827 131/273 |
| 2019/0295304 | A1 * | 9/2019 | Janardhan | G06T 13/205 |
| 2019/0295305 | A1 | 9/2019 | Yang et al. | |
| 2021/0001214 | A1 | 1/2021 | Flego et al. | |
| 2021/0015158 | A1 | 1/2021 | Moloney et al. | |

FOREIGN PATENT DOCUMENTS

| | | | |
|---|---|---|---|
| KR | 20200121364 | A | 10/2020 |
| WO | 2014019585 | A1 | 2/2014 |
| WO | 2014195805 | A2 | 12/2014 |
| WO | 2021207859 | A1 | 10/2021 |

OTHER PUBLICATIONS

International Search Report for PCT/EP2023/059479 mailed Nov. 25, 2022. 3 pages.
Communication pursuant to Article 94(3) EPC for European Application No. 22722166.0, dated Sep. 26, 2025, 6 pages.

* cited by examiner

*Primary Examiner* — Glenford J Madamba
(74) *Attorney, Agent, or Firm* — Lerner David LLP

(57) ABSTRACT

A method of connecting a user to an extended reality environment for an aerosol inhalation session includes: determining a state of an aerosol generating device; and facilitating connection of the user to the extended reality environment based on the determined state. There is also provided an aerosol generating device. There is also provided an electronic communication device.

12 Claims, 3 Drawing Sheets

AEROSOL GENERATING DEVICE, ELECTRONIC COMMUNICATION DEVICE AND METHOD

CROSS-REFERENCE TO RELATED APPLICATIONS

The present application is a national phase entry under 35 U.S.C. § 371 of International Application No. PCT/EP2022/059479, filed Apr. 8, 2022, published in English, the disclosure of which is incorporated herein by reference.

TECHNICAL FIELD

The present disclosure relates to an aerosol generating device, an electronic communication device, and a method of connecting a user to an extended reality environment.

BACKGROUND

Extended reality is a rapidly growing technology field. Extended reality is a term referring to all real-and-virtual combined environments and human-machine interactions generated by computer technology and wearables. For example, extended reality (XR) includes augmented reality (AR), mixed reality (MR), and virtual reality (VR). Recent advances have led to extended reality technology becoming widely available.

One problem associated with existing extended reality technology is ensuring an intuitive experience for a participant. With existing extended reality technology, it is often the case that the actions of the participant and/or the real-life sensory experience of the participant are not accurately reflected in the extended reality environment. This reduces the level of realism perceived by the participant, and ultimately impacts the engagement of the participant with the extended reality environment.

Separately, many consumers have turned to aerosol generating devices as an alternative to cigarettes. It is desired to improve and/or enhance the experience of users of aerosol generating devices. Many users of aerosol generating devices desire to use their devices in interactive and/or social settings. However, this is not always possible or practical.

Additionally, the existence of non-authentic or counterfeit products is a problem relating to consumer safety. It is a problem for both manufacturers and users of aerosol generating devices and related consumables that it is difficult to determine their authenticity.

It is the object of the invention to overcome at least one of the above referenced problems, or to provide an alternative solution.

SUMMARY

According to the present disclosure there is provided a method of connecting a user to an extended reality environment for an aerosol inhalation session, an aerosol generating device, and an electronic communication device, including the features as set out in the claims.

According to one aspect, there is provided a method of connecting a user to an extended reality environment for an aerosol inhalation session comprising: determining a state of an aerosol generating device; facilitating connection of the user to the extended reality environment based on the determined state.

In this way, it can be determined that the aerosol generating device is in a state or condition for use in an aerosol inhalation session, or that the user intends to use the aerosol generating device in the extended reality environment. Furthermore, by determining the state of the aerosol generating device, inadvertent starting of the aerosol inhalation session can be prevented.

In one example, the determination of the state of the aerosol generating device comprises determining that the aerosol generating device is activated.

In this way, the user can be connected to the extended reality environment when the device is activated, which may be following a user input.

In one example, the determination of the state of the aerosol generating device comprises determining that the aerosol generating device is in a heating mode.

In this way, robustness against false start of an aerosol inhalation session is provided.

In one example, the method comprises determining that the aerosol generating device is an authenticated device and the step of facilitating connection of the user to the extended reality environment is also based on this determination.

In this way, only authenticated devices can connect to the extended reality environment. Compatibility with the extended reality environment is thereby ensured. Non-authentic or counterfeit devices can be identified. Furthermore, in some cases, only specific users may connect to, and access, the extended reality environment.

In one example, the method comprises determining that a consumable of the aerosol generating device is within a predetermined group of authenticated consumables and the step of facilitating connection of the user to the extended reality environment is also based on this determination.

In this way, only users of authenticated consumables can connect to the extended reality environment. Compatibility with the extended reality environment is thereby ensured. Non-authentic or counterfeit devices can be identified.

In one example, the method comprises determining that a user of the aerosol generating device and/or consumable is an authenticated user. It may be determined that the aerosol generating device and/or consumable is an authenticated aerosol generating device and/or consumable based on determining that the user is an authenticated user. The step of facilitating connection of the user to the extended reality environment is also based on this determination.

In this way, only authenticated users may connect to, and access, the extended reality environment.

In one example, the method comprises requesting an access code from a server; receiving the access code; and using the access code to access the extended reality environment hosted by the server.

In this way, control of user connection to the extended reality environment is provided. Access to the extended reality environment (e.g., for the aerosol inhalation session) can thereby be time-limited or restricted to certain users. Additionally, or alternatively, the extended reality environment may be accessed until the user exits the extended reality environment, but once the user exits the extended reality environment the entry code is disabled.

In one example, the step of facilitating connection comprises: pairing the aerosol generating device with an electronic communication device, wherein the step of determining the state of the aerosol generating device occurs after the aerosol generating device is paired with the electronic communication device, wherein the electronic communication device communicates with the server to obtain the access code.

In this way, communication between the aerosol generating device with the electronic communication device is facilitated and/or improved.

In one example, the user accesses the extended reality environment using an extended reality headset.

In one example, the method comprises using one or more sensors of the extended reality headset to track the aerosol generating device and/or aerosol that is generated using the aerosol generating device; and simulating the aerosol generating device and/or the aerosol in the extended reality environment. The one or more sensors may be one or more cameras, one or more motion sensors and/or one or more microphones. Simulating the aerosol generating device and/or the aerosol in the extended reality environment may comprise reproducing the aerosol generating device and/or aerosol in a transformed appearance or graphic, or in a true-to-life appearance or graphic.

In this way, the actions of the participant and/or the real-life sensory experience of the participant are accurately reflected in the extended reality environment. This increases the level of realism perceived by the participant, and ultimately improves engagement of the participant with the extended reality environment.

In one example, the method comprises permitting interaction between the user and the environment and/or other users, within the extended reality environment.

In one example, the method comprises accessing a sub-session of the extended reality environment, wherein the sub-session access is based on one or more of: location, age, gender, aerosol generating device type, consumable type, and interests. The sub-session may be a sub-session in which the user can interact with other users that have compatible or matching features.

In one example, the method comprises determining a characteristic of the user during the aerosol inhalation session and adjusting the extended reality environment based on the determined characteristic.

In one example, the method comprises detecting an input action from the user; and adjusting the extended reality environment based on the detected input action.

In one example, the method comprises providing an indication to the user in the extended reality environment based on a characteristic of the aerosol generating device and/or consumable.

In one example, the method comprises providing all feedback to the user relating to the aerosol generating device and/or consumable via the extended reality headset. In one example, the method comprises, once the user has connected to, and accessed, the extended reality environment, switching off feedback mechanisms of the aerosol generating device and/or other user interfaces of the system.

According to one aspect, there is provided an aerosol generating device for connecting a user to an extended reality environment, wherein the aerosol generating device is configured to: determine a state of the aerosol generating device; and facilitate connection of the user to the extended reality environment based on the determined state.

According to one aspect, there is provided an electronic communication device according to the aerosol generating device aspect for connecting a user to an extended reality environment, wherein the electronic communication device is configured to: determine a state of an aerosol generating device; and facilitate connection of the user to the extended reality environment based on the determined state.

According to one aspect, there is provided an apparatus for connecting a user to an extended reality environment, wherein the apparatus is configured to: determine a state of an aerosol generating device; and facilitate connection of the user to the extended reality environment based on the determined state.

In one example, the apparatus comprises an aerosol generating device and/or an electronic communication device.

According to one aspect, there is provided a system for connecting a user to an extended reality environment, wherein the system is configured to:

determine a state of the aerosol generating device; and facilitate connection of the user to the extended reality environment based on the determined state.

In one example, the system may comprise one or more of: an aerosol generating device, an electronic communication device, a server, and an extended reality headset. In one example, the aerosol generating device is in accordance with an aspect above. In one example, the electronic communication device is in accordance with an aspect above.

Further advantages, objectives and features of the present invention will be described, by way of example only, in the following description with reference to the figures. In the figures, like components in different embodiments can exhibit the same reference symbols.

BRIEF DESCRIPTION OF THE DRAWINGS

Examples of the present disclosure will now be described with reference to the accompanying drawings.

DETAILED DESCRIPTION

Figure 1:
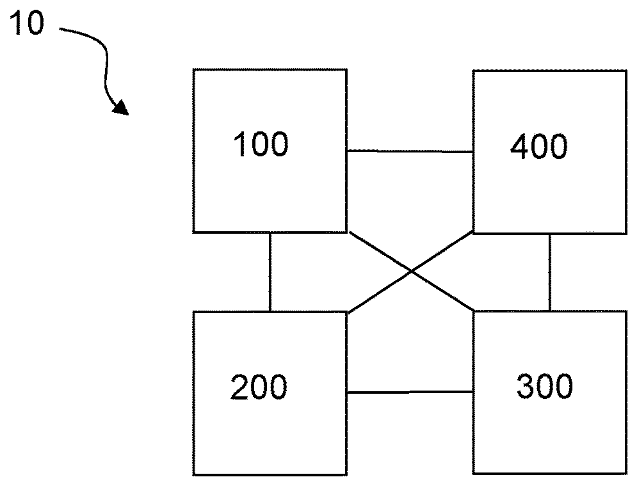
FIG. 1 shows a system.

FIG. 1 shows a system 10. The system 10 comprises an aerosol generating device 100 and an electronic communication device 200. The system 10 may further comprise a server 300. The system may further comprise an extended reality headset 400.

In an example, the aerosol generating device 100 is for connecting a user to an extended reality environment. The aerosol generating device 100 is configured to determine a state of the aerosol generating device 100. The aerosol generating device 100 is configured to facilitate connection of the user to the extended reality environment based on the determined state. The aerosol generating device 100 may otherwise be referred to as a "smart aerosol generating device", a "vaping device" or "smart vaping device". The extended reality environment may otherwise be referred to as an "extended reality inhalation environment".

In another example, the electronic communication device 200 is for connecting a user to an extended reality environment. The electronic communication device 200 is configured to determine a state of an aerosol generating device 100. The electronic communication device 200 is configured to facilitate connection of the user to the extended reality environment based on the determined state.

The electronic communication device 200 may otherwise be referred to as a "user terminal". The electronic communication device 200 may be a smartphone, a tablet, a desktop or laptop personal computer (PC), a smartwatch, or any other type of computer.

The server 300 is a remote server. The server 300 may be managed by the manufacturer of the aerosol generating device 100, or by a party affiliated with the manufacturer of the aerosol generating device 100. The server 300 hosts the extended reality environment.

The extended reality headset 400 is a head-mounted device that is configured to provide extended reality functionality for the wearer. The extended reality headset 400 may be a virtual reality headset. The construction of extended reality/virtual reality headsets is well understood in the field, and so will not be described in detail. An extended reality headset comprises a stereoscopic head-mounted display and head-motion-tracking sensors (which may include devices such as gyroscopes, accelerometers, magnetometers or structured light systems). The extended reality headset 400 comprises one or more cameras configured to image the space about the wearer and external to the extended reality headset 400. The extended reality headset 400 may be of the type sold under RTM Oculus Quest.

In the examples described herein, the electronic communication device 200 and extended reality headset 400 are described as distinct components. However, in other examples, the electronic communication device 200 may be comprised in the extended reality headset 400. That is, in the description herein, functions and features of the electronic communication device 200 may also, or instead, be functions and features of the extended reality headset 400.

In some examples, the aerosol generating device 100 is configured to communicate with the electronic communication device 200. The electronic communication device 200 is configured to communicate with the aerosol generating device 100. The electronic communication device 200 is configured to communicate with the server 300. The server 300 is configured to communicate with the electronic communication device 200. In some examples, the aerosol generating device 100 is configured to communicate with the server 300. In some examples, the server 300 is configured to communicate with the aerosol generating device 100. In some examples, the aerosol generating device 100 is configured to communicate with the extended reality headset 400. In some examples, the extended reality headset 400 is configured to communicate with the aerosol generating device 100

Communication between the aforementioned components may be performed in various ways, as will be well understood by those skilled in the art. Communication may comprise transmitting and/or receiving data. For example, data may be transmitted and/or received by wired or wireless connections.

As examples, the aerosol generating device 100 may be configured to communicate with the electronic communication device 200 by wireless communication methods including Bluetooth or Bluetooth Low Energy (BLE) communication. Other suitable wireless communication methods include wireless Local Area Network (LAN), Low Power Wide Area Network (LPWAN) and/or Near Field Communication (NFC). Wired communication methods are also suitable, including USB, MiniUSB, MicroUSB, and Lightning.

As examples, the electronic communication device 200 may be configured to communicate with the server 300 by wireless communication methods including Wi-Fi or wired communication methods.

Figure 2:
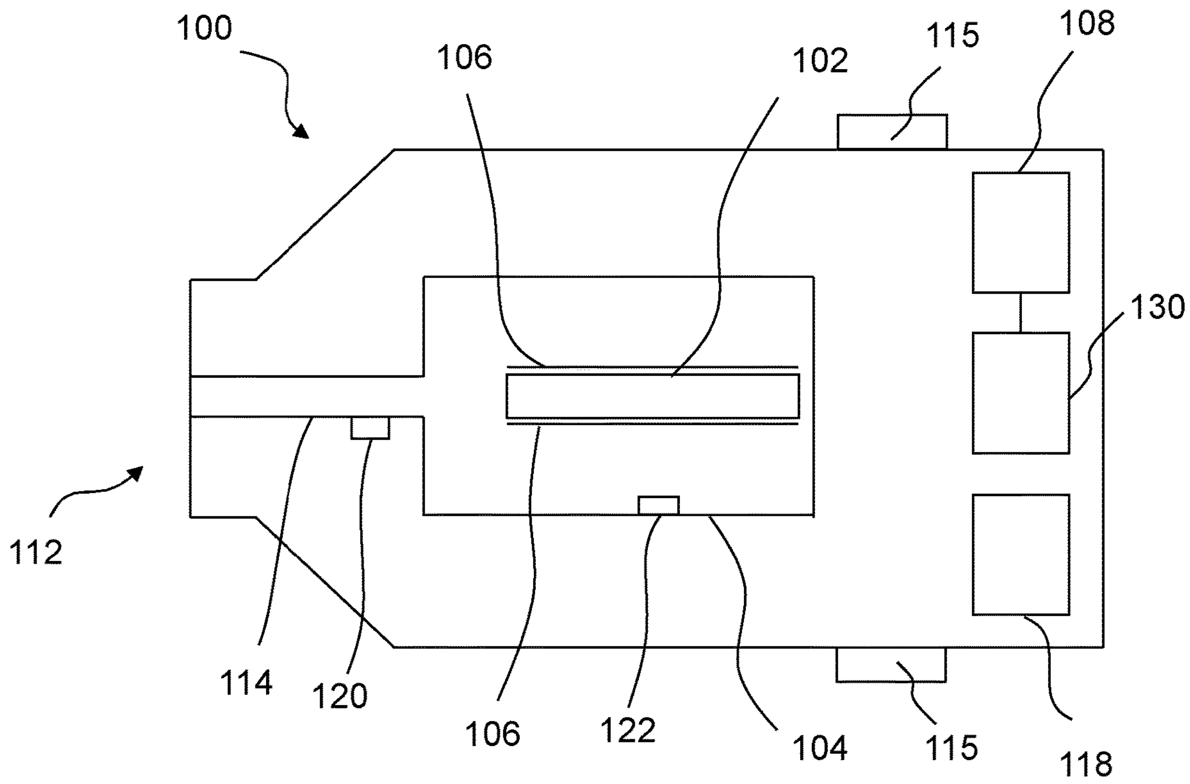
FIG. 2 shows a schematic view of an aerosol generating device.

FIG. 2 shows a schematic cross-sectional view of an aerosol generating device. The aerosol generating device 100 is suitable for receiving a consumable 102 therein. For example, the aerosol generating device 100 may include a chamber 104 in which the consumable 102 is received.

The invention is not limited to the specific aerosol generating device 100 or consumable 102 described herein. That is, the description of the aerosol generating device 100 and consumable 102 is provided for illustrative purposes only. The skilled person will appreciate that alternative constructions of aerosol generating devices and consumables will be compatible with the present invention.

A consumable comprises an aerosol substrate. The term aerosol substrate is a label used to mean a medium that generates an aerosol or vapour when heated. In one example, aerosol substrate is synonymous with smokable material, aerosol generating substrate and aerosol generating medium. Aerosol substrate includes materials that provide volatilized components upon heating, typically in the form of vapor or an aerosol. Aerosol substrate may be a non-tobacco-containing material or a tobacco-containing material. Aerosol substrate may, for example, include one or more of tobacco per se, tobacco derivatives, expanded tobacco, reconstituted tobacco, tobacco extract, homogenized tobacco or tobacco substitutes. Aerosol substrate also may include other, non-tobacco, products, which, depending on the product, may or may not contain nicotine. Aerosol substrate may comprise one or more humectants, such as glycerol or propylene glycol.

The aerosol generating device 100 may comprise one or more heaters 106 configured to provide heat to the consumable 102, in use.

In one example, the consumable is a liquid and the one or more heaters comprises a heating element, such as a coil, a ceramic heater, a flat resistive heater, a mesh heater, a MEMS heater, or the like, configured to aerosolise the liquid for inhalation. A liquid delivery element or mechanism, such as a porous material, a capillary system, and/or valve, may transfer the liquid to the heating element, in use. In some examples, the aerosolised liquid may pass through a solid substrate within the aerosol generating device 100. In other examples, the consumable may comprise a solid aerosol substrate.

In one example, the aerosol generating device 100 comprises a nebulizing engine, such as a vibrating mesh, to generate an aerosol from a liquid with or without heating thereof.

The aerosol generating device 100 may comprise a mouthpiece 112 through which a user draws on the aerosol generating device 100 to inhale generated aerosol. The mouthpiece 112 includes a vent or channel 114 that is connected to a region close to the consumable 102 for passage of any generated aerosol from the consumable 102, during use. For example, the channel 114 may extend between an opening in the mouthpiece 112 and the chamber 104 in which the consumable 102 is receivable. The mouthpiece 112 is arranged such it may be received in a user's mouth in use. In other examples, a mouthpiece 112 is not required and a portion of the consumable may protrude from the aerosol generating device 100.

The aerosol generating device 100 may comprise a trackable element 115. The trackable element 115 may be a sleeve provided around the aerosol generating device 100. The trackable element may be made from moulded silicone or other rubber. The trackable element may have a bright colour. In this way, the trackable element is highly visible to the one or more cameras of the extended reality headset 400.

The aerosol generating device 100 may comprise a control unit 108 (or control circuitry) for electronic management of the device. The control unit 108 may include a PCB or the like (not shown). The control unit 108 is configured to control the one or more heaters 106.

The aerosol generating device 100 may comprise an activation input sensor 118. The activation input sensor 118 may be a button, a touchpad, or the like for sensing a user's input, such as a tap or swipe. In other examples, the activation input sensor 118 comprises a consumable sensor configured to detect if a consumable 102 has been inserted into the aerosol generating device 100. For example, the input sensor 118 may comprise an authenticity detector that is configured to detect if an authentic consumable 102 has been inserted into the aerosol generating device 100. Additionally, or alternatively, the user input may also comprise an inhalation action by a user.

The aerosol generating device 100 may comprise a puff sensor 120 (otherwise known as an inhalation sensor). The puff sensor is configured to detect an inhalation action (or puff) by a user on the aerosol generating device 100. In one example, the puff sensor 120 comprises a microphone or a flow sensor configured to an airflow within the chamber 104 and/or an airflow channel extending from the chamber 104 through the mouthpiece 112 to an inhalation outlet thereof, the airflow being associated with a user's inhalation action. In other examples, the puff sensor 120 is configured to detect a change in pressure indicative of a beginning of an inhalation action on the aerosol generating device by the user. In this case, the puff sensor 120 may be located anywhere on the aerosol device 100 in which there would be a change in pressure due to an inhalation action of the user. In one example, the puff sensor is located in the channel 114 between the chamber 104 and the mouthpiece 112 of the aerosol generating device 100. The puff sensor 120 may also detect the end of an inhalation action by the user. For example, the puff sensor 120 may be configured to detect a further change in pressure due to the end of an inhalation action of a user.

The aerosol generating device 100 may include one or more temperature sensors 122 configured to directly or indirectly measure the temperature of the consumable 102 in the aerosol generating device 100. The one or more sensors may comprise a temperature sensor, such as a thermocouple or thermistor, configured to be located within or adjacent to the consumable 102 when it is received in the aerosol generating device 100. For example, the one or more temperature sensors 122 may be located within the chamber 104 of the aerosol generating device 100. In other examples, the temperature of the consumable 102 may be indirectly measured by the use of thermal imaging sensors.

The aerosol generating device 100 may include a power supply (not shown) such as a battery. The power supply may provide the aerosol generating device 100 with electrical energy providing a voltage in the range of 1 V and 8 V. In a preferred embodiment the voltage source is a lithium-ion battery delivering a value of 3.7 V. Such a voltage source is particularly advantageous for a modern aerosol generating device in view of rechargeability.

The aerosol generating device 100 may comprise a processor 130. The processor 130 is connected to the control unit 108. The processor 130 is configured to receive data from the control unit 108. In particular, the processor 130 is configured to receive data from the control unit 108 relating to various sensors/inputs (such as the activation input sensor 118, puff sensor 120 and/or temperature sensor 122) of the aerosol generating device 100.

The processor 130 and the control unit 108 may be integral with each other. In one example, a single component performs the function of the control unit 108 and processor 130. In other examples, the control unit 108 and the processor are distinct components.

The processor 130 may be configured to communicate with the electronic communication device 200. The processor 130 may be configured to transmit data to the electronic communication device 200. In this way, data relating to the aerosol generating device 100 can be provided to the electronic communication device 200.

Figure 3:
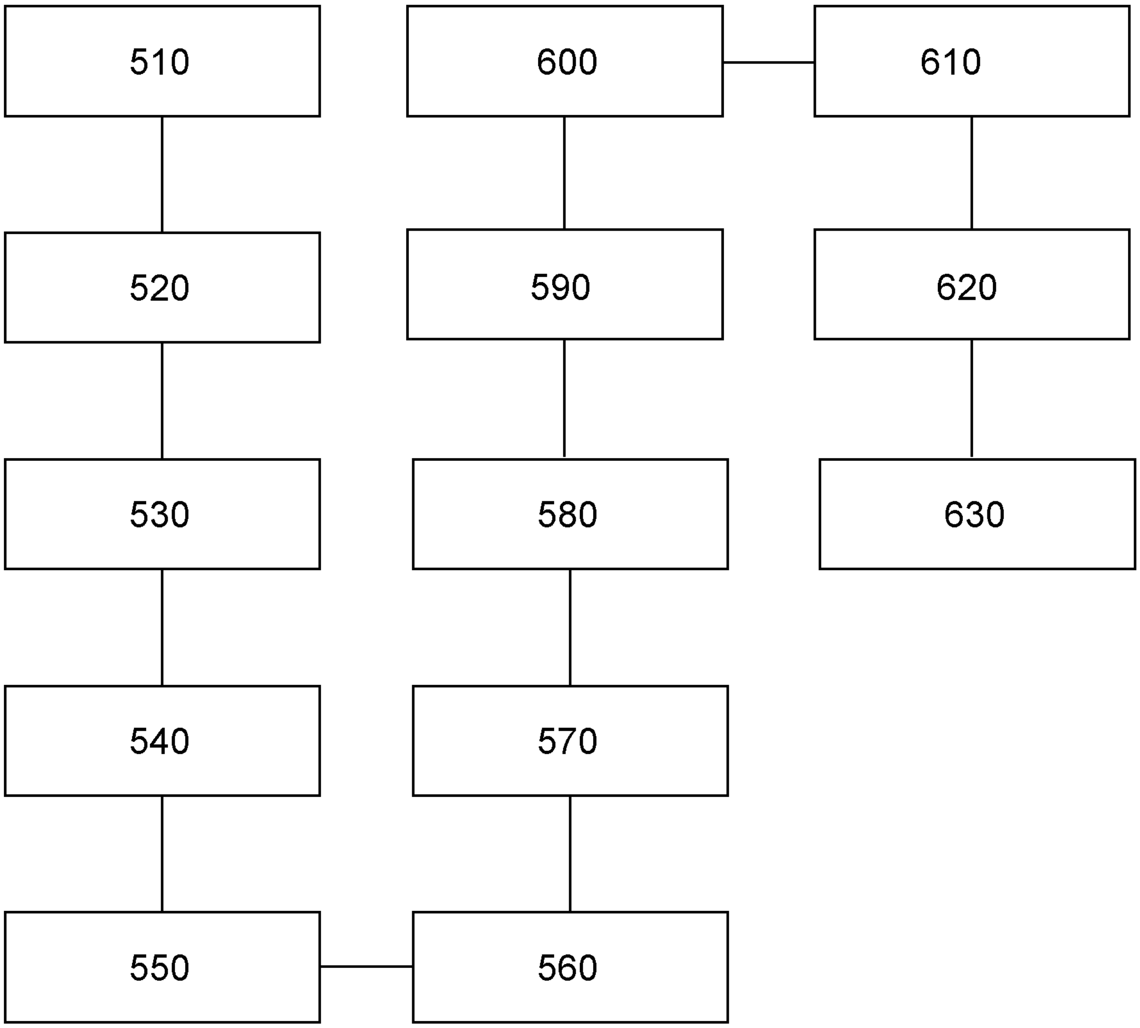
FIG. 3 shows a flow chart of a method of connecting a user to an extended reality environment.

Referring to FIG. 3, a flow chart of a method of connecting a user to an extended reality environment for an aerosol inhalation session is shown. Operation of the aerosol generating device 100, electronic communication device 200, server 300 and extended reality headset 400 will be described in relation to said figure. It will be understood that some steps of the method described herein are optional. Furthermore, it will be understood that the method is not restricted to being performed using a specific system, aerosol generating device and/or electronic communication device. That is, alternative systems, aerosol generating devices and/or electronic communication devices may be used to carry out the method as described herein. In particular, an electronic communication device 200 may not be required in the method or system.

The term "user" refers to the user of the system 10, aerosol generating device 100, electronic communication device 200, server 300 and/or extended reality headset 400.

The term "aerosol inhalation session" refers to a session or time period during which the user is connected to, or has accessed, the extended reality environment.

At Step 510, the aerosol generating device 100 is paired with the electronic communication device 200. In other words, a connection or link is made between the aerosol generating device 100 and the electronic communication device 200. Communication is thereby established between the aerosol generating device 100 and the electronic communication device 200. As will be described in further detail below, in this way, the state of the aerosol generating device 100 can be communicated to the electronic communication device 200. More generally, this communication link enables the aerosol generating device 100 to notify the use of the aerosol generating device 100 to the electronic communication device 200.

At Step 520, a state of the aerosol generating device 100 is determined. The aerosol generating device 100 is configured to determine the state. In this example, the processor 130 is configured to determine the state. In this way, it can be determined that the aerosol generating device is in a state or condition for use in an aerosol inhalation session, or that the user intends to use the aerosol generating device 100 in the extended reality environment. Furthermore, by determining the state of the aerosol generating device 100, inadvertent starting of the aerosol inhalation session can be prevented.

The state of the aerosol generating device 100 may be an operative state. By determining the state of the aerosol generating device 100, the processor 130 can notify the electronic communication device 200 is, or is not, in a state for starting the aerosol inhalation session. The state of the aerosol generating device 100 may be determined based on data provided by any one of the sensors (such as the activation input sensor 118, puff sensor 120 and/or temperature sensor 122) of the aerosol generating device 100.

Determining the state of the aerosol generating device 100 may comprise determining that the aerosol generating device 100 has been activated. In this example, the control unit 108 receives data from the activation input sensor 118. The processor 130 communicates to the electronic communication device 200 that data from the activation input sensor 118 has been received by the control unit 108. The data from the activation input sensor 118 may indicate a user input. In this way, it can be determined that the aerosol generating device 100 is in an activated state. The activated state of the aerosol generating device 100 indicates that the user intends to use the device in the extended reality environment for the aerosol inhalation session.

Determining the state of the aerosol generating device 100 may comprise determining that the aerosol generating device 100 is in a heating mode. In this example, the control unit 108 receives data from the temperature sensor 122. The processor 130 communicates to the electronic communication device 200 that data from the temperature sensor 122 has been received by the control unit 108. The data from the temperature sensor 122 may indicate that the aerosol generating device 100 is in a heating mode. In this way, it can be determined that the aerosol generating device 100 is in a state corresponding to a heating mode. It will be appreciated that data from other sensors may also indicate that the aerosol generating device 100 is in a heating mode. The state of the aerosol generating device 100 corresponding to the heating mode indicates that the device is heated ready to be used in, or is heating in preparation for use in, the extended reality environment for the aerosol inhalation session.

At Step 530, it is determined that the aerosol generating device 100 is an authenticated aerosol generating device 100. Facilitating connection to the extended reality environment is based on this determination.

An authenticated aerosol generating device 100 is one of a set of allowable aerosol generating devices. The set may include one or more (i.e., a plurality of) allowable aerosol generating devices. The authenticated aerosol generating device 100 may be recognised by a provider of the extended reality environment as an allowable aerosol generating device 100. The authenticated aerosol generating device 100 may be recognised by a host of the server 300 as an allowable aerosol generating device 100. In this way, genuine (i.e., non-counterfeit) aerosol generating devices can be identified. Furthermore, compatibility of the aerosol generating device 100 with the extended reality environment can be ensured.

In one example, an authenticated aerosol generating device 100 is determined based on data provided by the processor 130 to the electronic communication device 200 and/or to the server 300. The processor 130 transmits an identification signal. The electronic communication device 200 and/or server 300 may determine that the aerosol generating device 100 is an authenticated aerosol generating device based on the identification signal.

In another example, an authenticated aerosol generating device 100 is determined based on data provided by any one of the sensors (such as the activation input sensor 118, puff sensor 120 and/or temperature sensor 122) of the aerosol generating device 100. Characteristics of the data provided by any one of the sensors are provided to the electronic communication device 200 and/or server. The characteristics are compared with characteristics of authenticated aerosol generating devices to determine that the aerosol generating device 100 is one of a set of allowable aerosol generating devices.

At Step 540, it is determined that a consumable of the aerosol generating device 100 is within a predetermined group of authenticated consumables. Facilitating connection to the extended reality environment is based on this determination.

An authenticated consumable is one of a set of allowable consumables. The set may include one or more (i.e., a plurality of) allowable consumables. The authenticated consumable or consumables may be recognised by a provider of the extended reality environment as an allowable consumable or consumables. The authenticated consumable may be recognised by a host of the server 300 as an allowable consumable. In this way, genuine (i.e., non-counterfeit) consumables can be identified. Furthermore, compatibility of the consumable 102 with the extended reality environment can be ensured.

In one example, data from the authenticity detector of the activation input sensor 118 is used to determine that an authenticated consumable, for example consumable 102, has been inserted into the aerosol generating device 100.

In one example, in a further step (not shown), it is determined that the user of the aerosol generating device 100 and/or consumable 102 is an authenticated user. That is, the method may comprise authenticating a user of the device. This may be performed based on a user profile or fingerprint (e.g., using a fingerprint sensor, for example provided on the aerosol generating device 100 or electronic communication device 200). Authenticating the user may involve determining that the age of the user is above a threshold (from the user profile and/or from fingerprint). Authenticating the user may involve determining that the user is a recognised owner of the aerosol generating device 100 and/or consumable.

Once a user has been authenticated in this way, the aerosol generating device 100 and/or consumable 102 is recognised as an authenticated aerosol generating device and/or authenticated consumable 102. That is, an authenticated aerosol generating device 100 and/or authenticated consumable 102 may be determined by determining that the user is an authenticated user.

It will be appreciated that an authenticated aerosol generating device 100 may refer to an authenticated aerosol generating device 100 comprising a consumable 102, an aerosol generating device 100 comprising an authenticated consumable 102, an authenticated aerosol generating device 100 comprising an authenticated consumable 102, and/or an aerosol generating device 100 and/or consumable 102 used by an authenticated user. Once an authenticated aerosol generating device 100 is determined, connection of the user to the extended reality environment may be enabled based on the determination.

At Step 550, a type of the device and/or consumable is determined. In this way, users can be grouped in the extended reality environment based on the type of the device and/or consumable.

In one example, the type of the device and/or consumable is determined based on data provided by the processor 130 to the electronic communication device 200 and/or to the server 300. The processor 130 transmits a device identification signal and/or a consumable identification signal. The electronic communication device 200 and/or server 300 determines the type of the device and/or consumable based on the device identification signal and/or consumable identification signal.

The type of the aerosol generating device 100 may include a model and/or a style.

The type of the consumable 102 may include a flavour and/or a nicotine concentration.

Step 550 of determining the type of the device and/or consumable may be performed as a distinct step. Alternatively, Step 550 may be performed as part of Steps 530 and 540.

At Step 560, the aerosol generating device 100 notifies the electronic communication device 200 of the state of the aerosol generating device 100. The electronic communication device 200 can determine (including by inferring) that the user intends to use the aerosol generating device 100 in an extended reality environment for an aerosol inhalation session. The electronic communication device 200 runs local software, such as an application (an "app"), which interacts with the server 300.

At Step 570, an access code is requested from the server 300.

The access code is a code for accessing the extended reality environment. The request may be automatic. For example, the request may be sent automatically when the aerosol generating device 100 notifies the electronic communication device 200 that the device 100 is in a state ready for use in the extended reality environment. Alternatively, the request may be manual. For example, the user may interact with the electronic communication device 200 to request an access code from the server 300.

In one example, the access code is only provided to a user who is one of a set of approved users. An approved user may be a member, customer or affiliate, of a service or service provider. That is, the server 300 may determine whether the user is one of a set of approved users, and, if so, provide the access code to the electronic communication device 200. In another example, any user may be provided with an access code. In this case, it may be required that the user is a user of an authenticated device and/or authenticated consumable.

The server 300 may determine whether the user is one of a set of approved users based on a fingerprint, user profile associated with the aerosol generating device, or any other parameter which acts as an identification of the user. In some examples, this parameter is used to access the extended reality environment. In such cases, the generation or provision of an access code may not be necessary.

In one example, the access code is valid for a single entry to the extended reality environment. In other words, the access code is usable once before expiring. In another example, the access code allows entry to the extended reality environment but only for a limited duration. In another example, the access code allows entry to the extended reality environment for an unlimited duration. In another example, Additionally, the extended reality environment may be accessed until the user exits the extended reality environment, but once the user exits the extended reality environment the entry code is disabled.

At Step 580, the access code is received and used to access the extended reality environment hosted by the server 300. The access code is received by the electronic communication device 200. The access code is entered (automatically or manually) at an extended reality environment login page displayed to the user in the extended reality headset 400. User access to the extended reality environment is enabled.

As introduced above, connection to the extended reality environment is facilitated based on one or more of a number of factors.

At Step 590, connection to the extended reality environment is facilitated based on:

- the state of the aerosol generating device 100 (as determined in Step 520);
- the determination of an authenticated aerosol generating device 100 (as determined in Step 530); and/or
- the determination of an authenticated consumable 102 (as determined in Step 540).

The term "connection" is used to refer to the connecting the user to the extended reality environment. Such a connection may enable the user to access the extended reality environment. Alternatively, such a connection may enable the user to connect to the extended reality environment, but an access code may be required to access the extended reality environment. That is, connecting the user to the extended reality environment may take the user to a login page at which an access code or other details may be required to access the extended reality environment.

The term "access" is used to refer to enabling the user to access or enter the extended reality environment such that the user can interact with the environment and/or other users of the extended reality environment.

Furthermore, also at Step 590, the access code is used to access the extended reality environment hosted by the server 300.

Following Step 590, the user (wearing the extended reality headset 400) has connected to, and accessed, the extended reality environment, such that the user can interact with the environment and/or other users of the extended reality environment. The user may be described as a participant of, or in, the extended reality environment. In the extended reality environment, the user participates in an aerosol inhalation session.

At Step 600, the one or more cameras of the extended reality headset 400 are used to track the aerosol generating device 100 and/or aerosol that is generated as the user uses the aerosol generating device 100. The aerosol generating device 100 and/or generated aerosol are simulated in the extended reality environment. That is, the action of the user using the aerosol generating device 100, and the real-life sensory experience of the user using the aerosol generating device 100 to generate aerosol, are accurately reflected in the extended reality environment.

The extended reality headset 400 tracks the aerosol generating device 100 by tracking the trackable element 115. The location and motion of the aerosol generating device 100 can thereby be determined.

The extended reality headset 400 determines a condition of the aerosol for simulating the aerosol in the extended reality environment. The condition may include size, shape, direction, level of opaqueness, and amount of the aerosol (or an "aerosol cloud"). To do this, the extended reality headset 400 may receive data from sensors of the aerosol generating device 100, such as the puff sensor 120 and/or temperature sensor 122. Additionally, or alternatively, the one or more cameras of the extended reality headset 400 may detect the aerosol and provide data for simulating the aerosol in the extended reality environment. The aerosol is displayed to the user as an aerosol graphic.

A characteristic of the aerosol graphic may be altered based on user selection. For example, the aerosol graphic may have characteristic of smoke, fire, light and/or ice.

Simulating the aerosol generating device and/or the aerosol in the extended reality environment may comprise reproducing the aerosol generating device 100 and/or aerosol in a transformed appearance or graphic, or in a true-to-life appearance or graphic.

The extended reality headset 400 may provide selective communication to the user of the extended reality environment. Selective communication may be based on one or more features, including location, age, gender, device type, consumable type, user interests and the user profile of the user.

In one example, an indication is provided to the user in the extended reality environment based on a characteristic of the aerosol generating device 100. The characteristic may be an operating state of the aerosol generating device 100. The characteristic may be determined based on data from the sensors of the aerosol generating device 100, such as the puff sensor 120 and/or temperature sensor 122. In general, data provided by any sensor of the aerosol generating device 100, electronic communication device 200 and/or extended reality headset 400 may be used to cause a change (i.e., display a graphic) in the extended reality environment.

For example, during heating of the aerosol generating device 100 (indicated by temperature sensor 122), an output may be provided to the user in the extended reality environment via the extended reality headset 400 to indicate heating in-progress, or completed heating, or the aerosol generating device 100. That is, when the aerosol generating device 100 reaches a target (e.g. operational) temperature, an output may be provided to the user in the extended reality environment. Additionally, expiry or end-of-life of a consumable, insertion of a new consumable, or expiry of a period of heating of the aerosol generating device 100, may be indicated to the user in a similar manner, by providing an output to the user via the extended reality headset 400.

In general terms, in relation to the above, events related to the aerosol generating device 100 can trigger changes in the extended reality environment. In this way, no user interface or feedback is required other than that provided by the extended reality environment. In one example, once the user has connected to, and accessed, the extended reality environment, feedback mechanisms of the aerosol generating device, or other user interfaces of the system, can be switched off. All information can be provided to the user via the extended reality headset 400.

At Step 610, interaction between the user and the environment, and/or the user and other users, is permitted within the extended reality environment. That is, the user of the aerosol generating device 100 can interact with the environment and/or other users of the extended reality environment. In this way, the user can participate in an interactive and social extended reality environment.

For the avoidance of doubt, "other users" are users of other systems and aerosol generating devices used to connect to the same extended reality environment.

The server 300 monitors user usage of the extended reality environment. The server 300 also monitors user usage of the aerosol generating device, including puff length, number of puffs, intensity of puffs, amount of aerosol generated and/or number of consumables 102 consumed. The aerosol generating device 100 and/or electronic communication device 200 may provide this data to the server 300.

At Step 620, a sub-session of the extended reality environment is accessed based on one or more of: location, age, gender, aerosol generating device type, consumable type, and interests. That is, users may be grouped into sub-sessions of the extended reality environment based on one or more features, including location, age, gender, device type, consumable type and interests. This feature information may be provided by the user in a user profile, or provided to the server 300 by the aerosol generating device 100 and/or electronic communication device 200. In this way, a more engaging user experience is provided in which users can gather socially whilst using their aerosol generating devices.

At Step 630, a characteristic of the user during the aerosol inhalation session is determined, and the extended reality environment is adjusted based on the determined characteristic.

That is, the extended reality environment can be adjusted in real-time based on a characteristic of the user. For example, the electronic communication device 200 and/or server 300 may determine that the user has a first characteristic (e.g., is stressed) based on data from the aerosol generating device 100, for example based on data provided by the puff sensor 120. The extended reality environment may be adjusted in response to the determined characteristic of the user, for example, by playing relaxing music or providing relaxing images or warm colours to the user.

Figure 4:
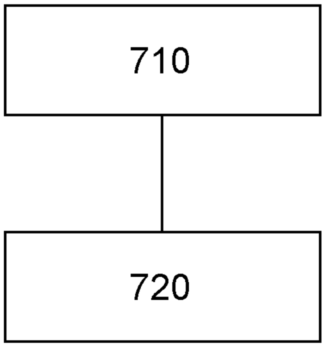
FIG. 4 shows general methodology principles.

Referring to FIG. 4, a method of connecting a user to an extended reality environment for an aerosol inhalation session is shown. Step 710 comprises determining a state of an aerosol generating device. Step 720 comprises facilitating connection of the user to the extended reality environment based on the determined state.

Figure 5:
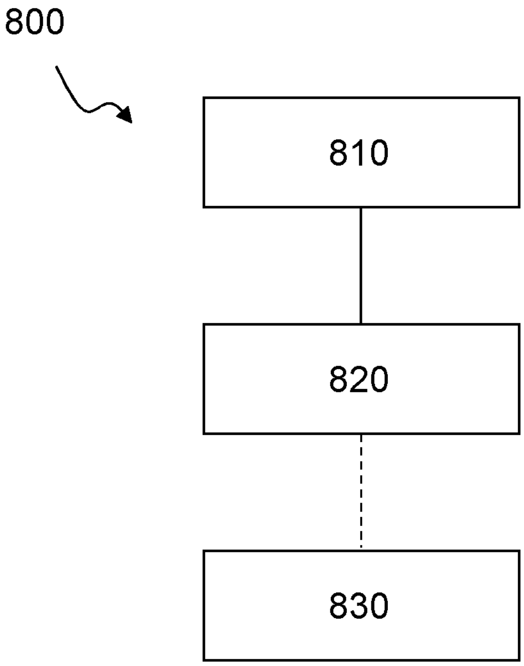
FIG. 5 shows a schematic view of an apparatus.

Referring to FIG. 5, an apparatus 800 for connecting a user to an extended reality environment is shown. The apparatus is configured to determine a state of an aerosol generating device 810. The apparatus is configured to facilitate connection of the user to the extended reality environment 820 based on the determined state. The apparatus 800 may comprise the aerosol generating device 810 and/or an electronic communication device 830.

Although preferred embodiments have been shown and described, it will be appreciated by those skilled in the art that various changes and modifications might be made without departing from the scope of the invention. One or more of the steps described above may be optional and not performed in systems and methods without departing from the scope of the invention. The scope of the invention is as defined in the appended claims.

The invention claimed is:

1. A method of providing an extended reality environment for an aerosol inhalation session comprising:

pairing an aerosol generating device with an electronic communication device;

determining a state of the aerosol generating device is activated and/or in a heating mode;

requesting, by the electronic communication device based on the determined state, an access code from a server;

receiving, by the electronic communication device, the access code from the server, accessing, by the electronic communication device using the access code, an extended reality environment hosted by the server; and facilitating the extended reality environment based on the determined state.

2. The method according to claim 1, further comprising determining that the aerosol generating device is an authenticated device, and wherein the step of facilitating the extended reality environment is also based on determining that the aerosol generating device is an authenticated device.

3. The method according to claim 1, further comprising determining that a consumable of the aerosol generating device is within a predetermined group of authenticated consumables, and wherein the step of facilitating the extended reality environment is also based on determining that a consumable of the aerosol generating device is within a predetermined group of authenticated consumables.

4. The method according to claim 1, wherein the step of determining the state of the aerosol generating device occurs after the aerosol generating device is paired with the electronic communication device.

5. The method according to claim 1, wherein the user accesses the extended reality environment using an extended reality headset.

6. The method according to claim 5, further comprising:

using one or more sensors of the extended reality headset to track the aerosol generating device and/or aerosol that is generated using the aerosol generating device; and simulating the aerosol generating device and/or the aerosol in the extended reality environment.

7. The method according to claim 1, further comprising permitting interaction between the user and the environment and/or other users, within the extended reality environment.

8. The method according to claim 1, further comprising:

accessing a sub-session of the extended reality environment, wherein the sub-session access is based on one or more of:

location, age, gender, aerosol generating device type, consumable type, or interests.

9. The method according to claim 1, further comprising:

determining a characteristic of the user during the aerosol inhalation session and adjusting the extended reality environment based on the determined characteristic.

10. The method according to claim 1, further comprising:

detecting an input action from the user; and adjusting the extended reality environment based on the detected input action.

11. An apparatus for connecting a user to an extended reality environment, the apparatus comprising:

a processor, the processor configured to:

pair an aerosol generating device with an electronic communication device;

determine a state of the aerosol generating device is activated and/or in a heating mode;

request an access code from a server;

receive the access code from the server;

access, using the access code, an extended reality environment hosted by the server; and facilitate the extended reality environment based on the determined state.

12. The apparatus as claimed in claim 11, wherein the apparatus comprises an aerosol generating device and/or an electronic communication device.

* * * * *